(12) United States Patent
Honda et al.

(10) Patent No.: US 11,874,109 B2
(45) Date of Patent: Jan. 16, 2024

(54) ROTATION ANGLE DETECTION DEVICE

(71) Applicant: DENSO CORPORATION, Kariya (JP)

(72) Inventors: Hitomi Honda, Kariya (JP); Yoshiyuki Kouno, Kariya (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 17/559,432

(22) Filed: Dec. 22, 2021

(65) Prior Publication Data

US 2022/0113124 A1     Apr. 14, 2022

Related U.S. Application Data

(63) Continuation of application No. PCT/JP2020/021874, filed on Jun. 3, 2020.

(30) Foreign Application Priority Data

Jun. 28, 2019  (JP) ................. 2019-120743

(51) Int. Cl.
*G01B 7/30*     (2006.01)
*G01D 5/14*     (2006.01)
*G01D 5/16*     (2006.01)

(52) U.S. Cl.
CPC ............ *G01B 7/30* (2013.01); *G01D 5/145* (2013.01); *G01D 5/16* (2013.01)

(58) Field of Classification Search
CPC ......... G01B 7/30; G01D 5/145; G01D 5/2457
See application file for complete search history.

(56) References Cited

U.S. PATENT DOCUMENTS

| 6,930,477 B1 * | 8/2005 | Kurita .................... G01D 5/145 324/252 |
| 7,323,866 B1 | 1/2008 | Uryu et al. |
| 2002/0189584 A1 | 12/2002 | Tanaka et al. |
| 2005/0022785 A1 * | 2/2005 | Kurita .................. F02D 9/1065 73/114.37 |
| 2007/0229061 A1 * | 10/2007 | Uryu ..................... G01D 5/145 324/207.25 |

FOREIGN PATENT DOCUMENTS

| JP | S58-112676 | 7/1983 |
| JP | 2008-281556 | 11/2008 |
| JP | 2014-151643 | 8/2014 |
| JP | 6070242 | 2/2017 |

\* cited by examiner

*Primary Examiner* — Tung X Nguyen
(74) *Attorney, Agent, or Firm* — Nixon & Vanderhye P.C.

(57) ABSTRACT

A rotation angle detection device that detects a rotation angle of a valve body. The rotation angle detection device includes a shaft, a gear, a magnetic field generator, and a magnetic detection element. The shaft is connected to the valve body. The magnetic field generator is arranged on a gear side and generates a magnetic field. The magnetic detection element is arranged on an extension of the shaft and detects magnetic flux density of the magnetic field that rotates together with the gear.

7 Claims, 11 Drawing Sheets

FIG. 16

ROTATION ANGLE DETECTION DEVICE

CROSS REFERENCE TO RELATED APPLICATIONS

The present application is a continuation application of International Patent Application No. PCT/JP2020/021874 filed on Jun. 3, 2020, which designated the U.S. and claims the benefit of priority from Japanese Patent Application No. 2019-120743 filed on Jun. 28, 2019. The entire disclosures of all of the above applications are incorporated herein by reference.

TECHNICAL FIELD

The present disclosure relates to a rotation angle detection device.

BACKGROUND

A rotation angle detection device that detects a rotation angle of a valve gear driven by an electric actuator has been proposed. This rotation angle detection device includes a magnetic circuit unit that rotates together with a valve gear, and a magnetic detection element such as a Hall element that detects a change in magnetic flux due to the rotation of the magnetic circuit unit. When the valve gear is rotated, the magnetic circuit unit is also rotated, and the angle between the magnetic flux formed by the magnetic circuit unit and the magnetic detection element changes. As a result, the magnetic detection element can detect the change in the rotation angle as the change in the magnetic field strength.

SUMMARY

The present disclosure provides a rotation angle detection device. The rotation angle detection device that detects a rotation angle of a valve body. The rotation angle detection device includes a shaft, a gear, a magnetic field generator, and a magnetic detection element. The shaft is connected to the valve body. The magnetic field generator is arranged on a gear side and generates a magnetic field. The magnetic detection element is arranged on an extension of the shaft and detects magnetic flux density of the magnetic field that rotates together with the gear.

BRIEF DESCRIPTION OF DRAWINGS

The features and advantages of the present disclosure will become more apparent from the following detailed description made with reference to the accompanying drawings. In the drawings.

DETAILED DESCRIPTION

For example, in such a rotation angle detection device, the magnetic detection element may be affected by a change in an external magnetic field. In this case, there is a difficulty that the detection accuracy of the rotation angle of the valve gear may be lowered. For example, if a member that generates a magnetic field such as a motor is placed near the rotation angle detection device, or if there is a member that generates a magnetic field by energization such as a harness or coil, the detection accuracy of the rotation angle detection device may be affected by the magnetic field generated by such an external device.

An exemplary embodiment of the present disclosure provides a rotation angle detection device that detects a rotation angle of a valve body is provided. The rotation angle detection device includes a shaft, a gear, a magnetic field generation unit, a fixing metal member, and a magnetic detection element. The shaft is connected to the valve body. The gear is connected to the shaft and rotates the shaft to rotate the valve body. The magnetic field generation unit is arranged on a gear side and generates a magnetic field. The fixing metal member is made of a magnetic material, is provided at a position covering at least a part of the magnetic field generation unit, and fixes the gear to the shaft. The magnetic detection element is arranged on an extension of the shaft and detects magnetic flux density of the magnetic field that rotates together with the gear.

In the exemplary embodiment of the present disclosure, since the fixing metal member is a magnetic material, at least a part of the magnetic field from the outside can be shielded. As a result, even if a member such as a motor, harness, or coil that generates a magnetic field that disturbs the rotation angle detection device is placed in the vicinity of the rotation angle detection device, the fixing metal member shields at least a part of the disturbance magnetic field. Therefore, the configuration can suppress the influence of the disturbance magnetic field on the magnetic detection element and suppress the deterioration of the detection accuracy.

First Embodiment

Figure 1:
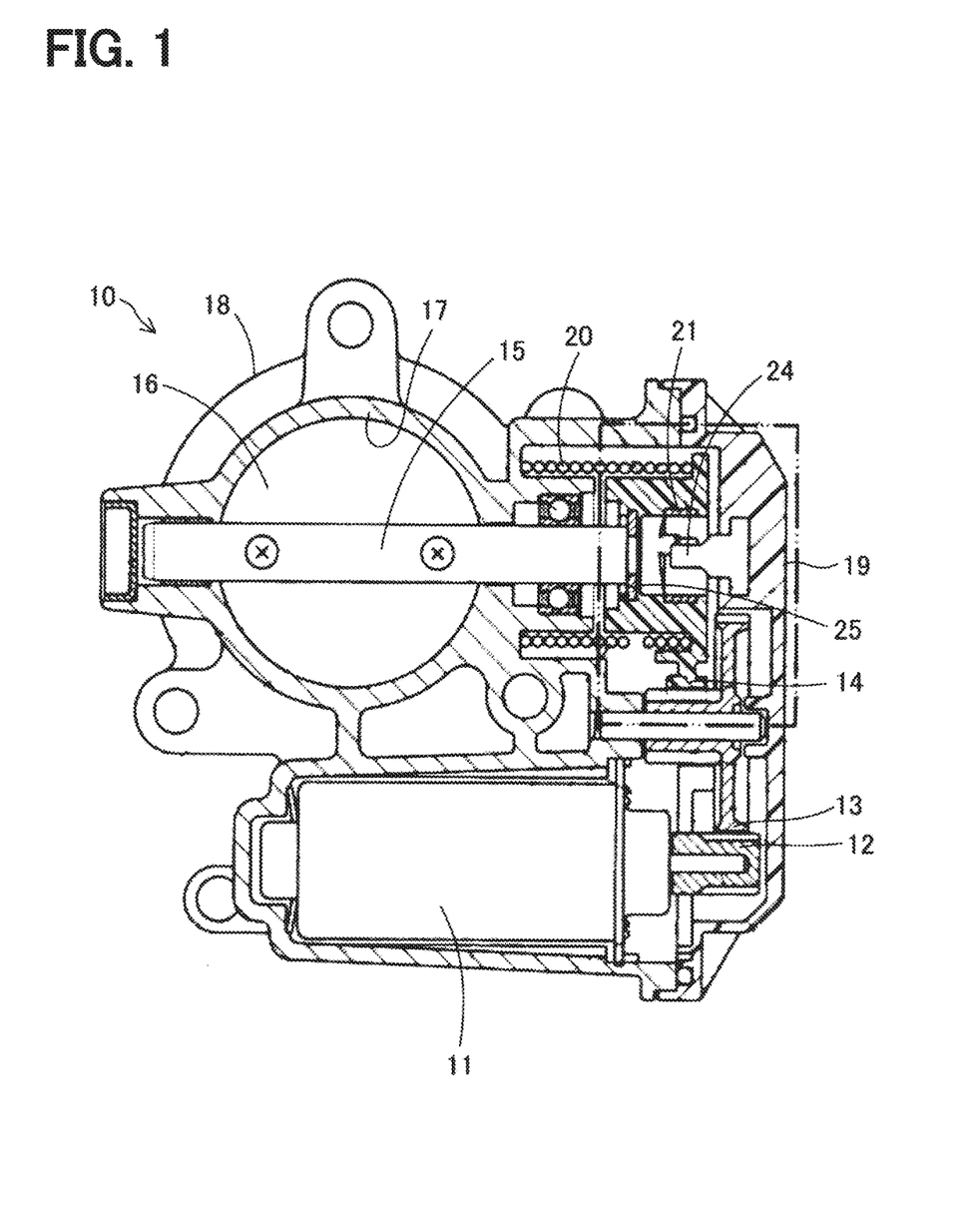
FIG. 1 is an explanatory diagram showing a schematic configuration of an electronic control throttle including a rotation angle detection device.
Figure 2:
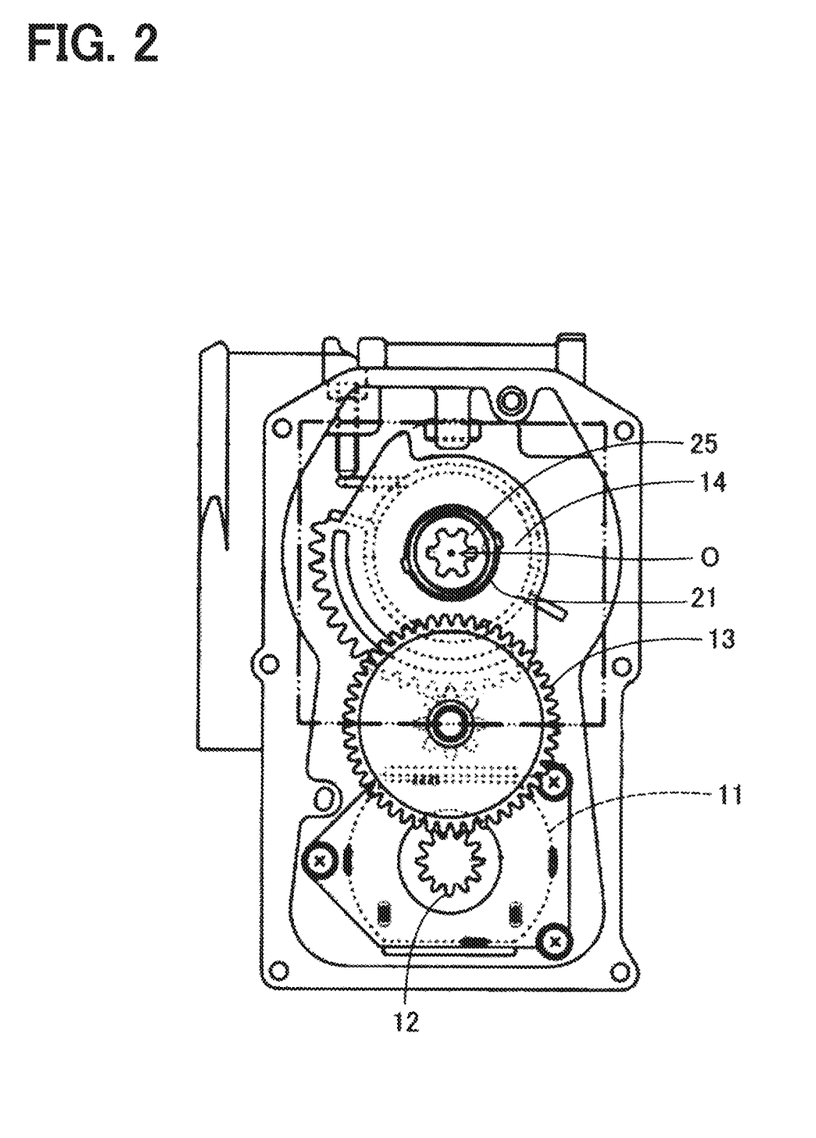
FIG. 2 is an explanatory diagram showing a schematic configuration of the electronic control throttle including the rotation angle detection device.

FIGS. 1 and 2 show an electronic control throttle 10 provided with a rotation angle detection device for detecting a rotation angle of a valve body 16. The electronic control throttle 10 controls the amount of intake air to the engine of the vehicle by rotating the valve body 16 provided in an intake passage 17. The electronically controlled throttle 10 includes a motor 11, gears 12, 13, 14, a shaft 15, the valve body 16, the intake passage 17, a housing 18, a housing cover 19, a spring 20, a magnetic field generation unit 21, a magnetic detection element 24, and a fixing metal member 25.

The intake passage 17 is provided inside the housing 18. The intake passage 17 is provided with the valve body 16 for controlling the flow of air in the intake passage 17. The valve body 16 is, for example, a butterfly valve and is rotatably supported by a shaft 15. The shaft 15 is made of metal, and a resin gear 14 is fixed to one end thereof. The shaft 15 and the gear 14 are fixed by using the magnetic fixing metal member 25 that is insert-molded into the gear 14. The gear 14 is connected to the motor 11 via the gears 13 and 12. The motor 11 is controlled by an ECU (not shown) that controls the operation of the engine (not shown). When an accelerator pedal (not shown) is depressed, the ECU drives the motor 11 according to the depression amount, sucks the vehicle into the engine by sequentially rotating the gears 12, 13, 14 and the shaft 15 to rotate the valve body 16, and adjusts the amount of air to increase or decrease the output of the engine. The spring 20 is a torsion spring and generates a force for urging the valve body 16 in the direction of opening or closing the valve body 16. The spring 20 may be a spring of another form such as a coil spring. The spring 20 may be either a coil spring that urges the valve body 16 in the valve closing direction or a coil spring that urges the valve body 16 in the valve opening direction.

The ECU detects how much the valve body 16 is rotated and opened by using the magnetic field generation unit 21 and the magnetic detection element 24. A magnetic field generation unit 21 for generating a magnetic field is integrally formed on the gear 14. The magnetic detection element 24 is arranged on the housing cover 19. The magnetic detection element 24 is arranged inside the magnetic field generation unit 21 so as to be located on an extension of the shaft 15. The magnetic detection element 24 detects the magnetic flux density of the magnetic field in a predetermined detection direction of the magnetic field generated by the magnetic field generation unit 21. The magnetic detection element 24 is preferably arranged at the center of rotation of the gear 14. The magnetic detection element 24 is composed of, for example, a Hall element. An MR element may be used instead of the Hall element. Further, the magnetic detection element 24 may be configured to detect the magnetic flux density in two directions. For example, the two magnetic detection elements may be arranged so that the detection directions of the magnetic flux densities of the two magnetic detection elements intersect with each other. In this case, the two magnetic detection elements may be housed in one package or may be housed in separate packages. The fixing metal member 25 is integrally formed with the gear 14, and fixes the shaft 15 and the gear. Further, the fixing metal member 25 is formed of a magnetic material such as a cold-rolled steel plate (SPCC), and shields the magnetic field from the outside so that the magnetic field from the outside does not affect the magnetic field generation unit 21. The fixing metal member 25 may be formed of a soft magnetic material such as a silicon steel plate or a ferrite core, instead of a ferromagnetic material such as a cold-rolled steel plate. Forming the fixing metal member 25 with a cold-rolled steel plate has the effects that the material is easily available, the workability of the punching press is good, and the cost can be reduced.

The gear 14 rotates around a rotation center O. The fixing metal member 25 for fixing the shaft 15 is integrally formed around the rotation center O. When the gear 14 is viewed from the axial direction of the rotation center O, the magnetic field generation unit 21 is arranged so as to overlap the outer circumference of the fixing metal member 25. The magnetic field generation unit 21 does not have to overlap with the outer circumference of the fixing metal member 25 when the gear 14 is viewed from the axial direction of the rotation center O. The magnetic field generation unit 21 is also integrally formed with the gear 14.

Figure 3:
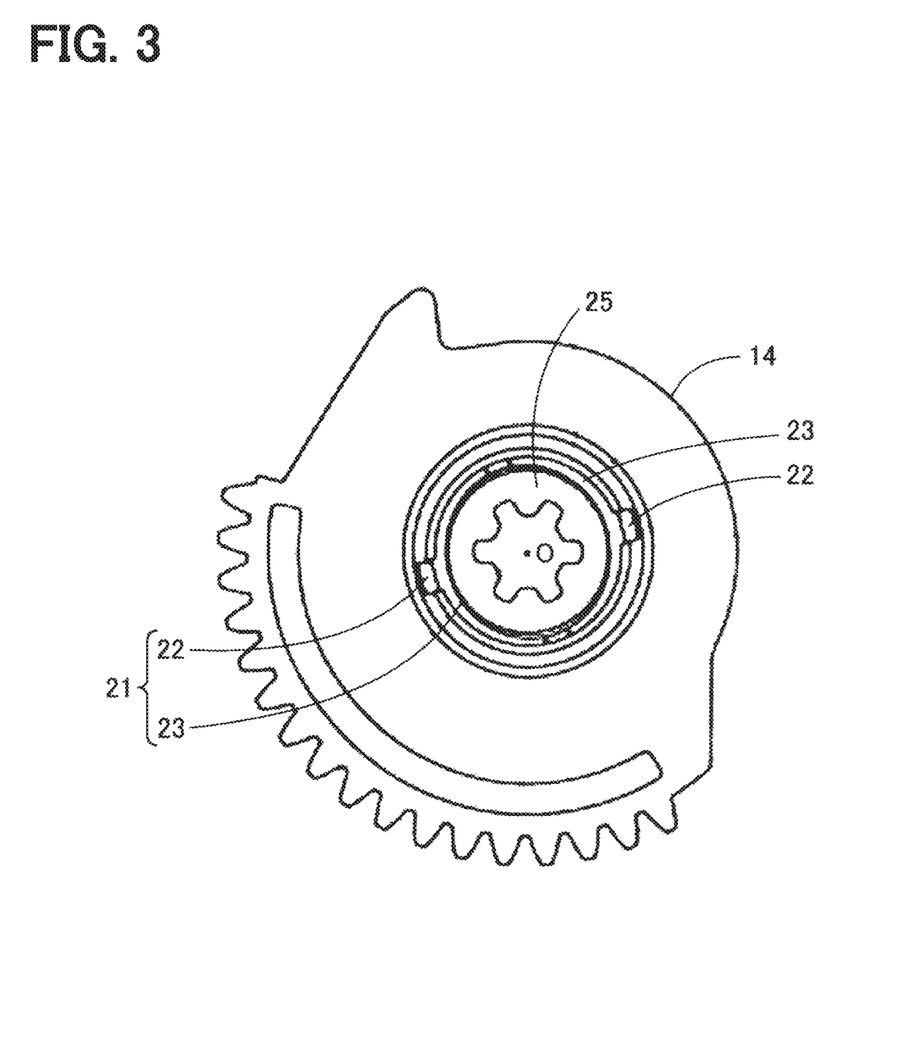
FIG. 3 is an explanatory diagram showing a gear configuration.
Figure 4:
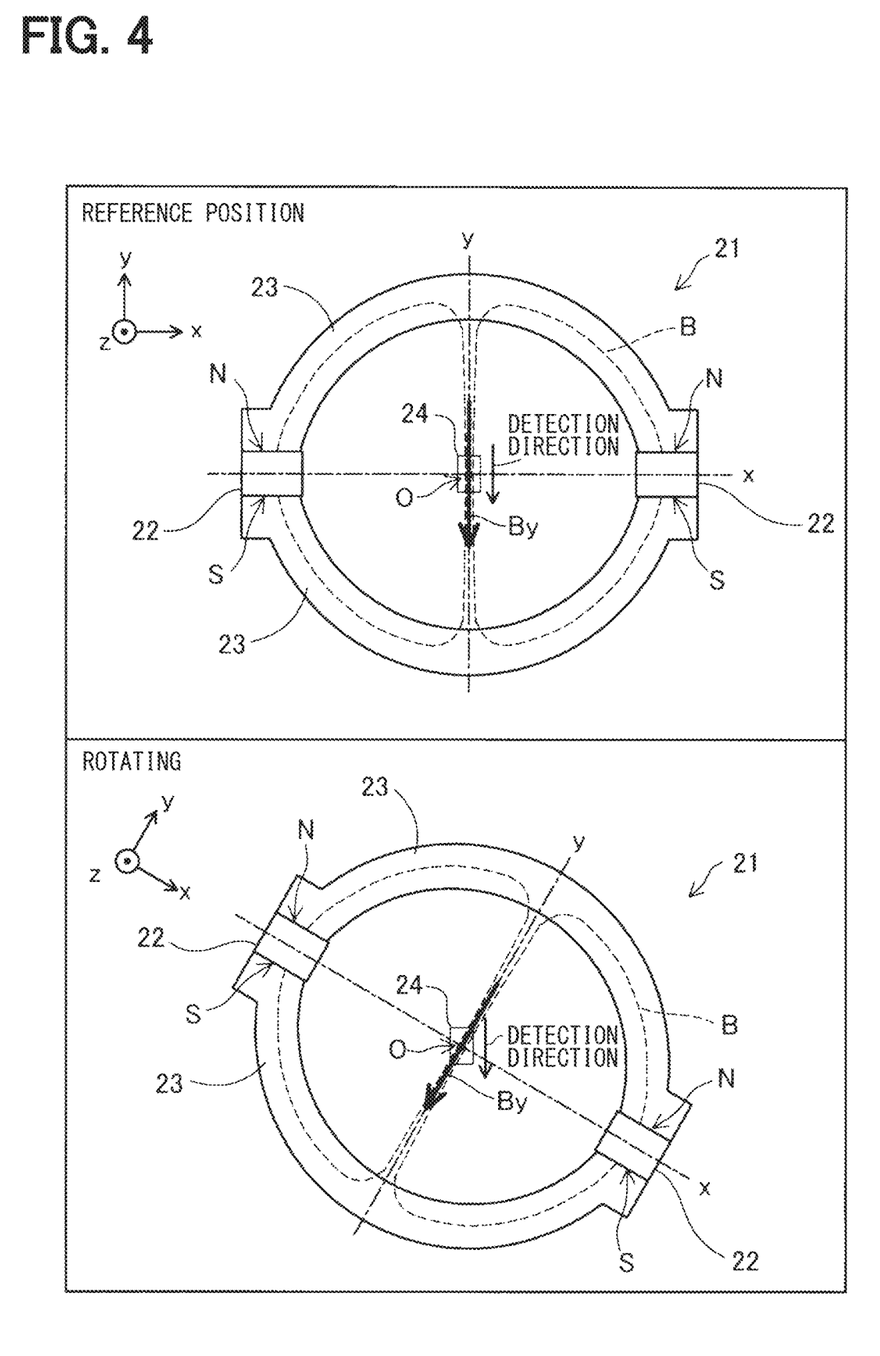
FIG. 4 is an explanatory diagram showing a configuration of a magnetic circuit.

As shown in FIGS. 3 and 4, the magnetic field generation unit 21 includes a pair of magnets 22 and a pair of yokes 23. The xyz direction is defined in preparation for the description of the shape and arrangement direction of each part of the magnetic field generation unit 21 and the shape and arrangement direction of the fixing metal member 25 described later. As shown in FIG. 4, the arrangement direction of the pair of magnets 22 is the x direction, the direction in which the pair of yokes 23 face each other is the y direction, and the direction perpendicular to the x and y directions is the z direction. The y direction coincides with the direction By of the magnetic field line at the center of the magnetic field generation unit 21. Further, the z direction coincides with the direction along the axial direction of the shaft 15. Each yoke 23 has a substantially arcuate shape. Ends of the two yokes 23, which are arranged to face each other, sandwich the magnets 22 such that the magnetic field generation unit 21 has a substantially cylindrical shape consisting of the pair of magnets 22 and the pair of yokes 23. At this time, the north poles of the two magnets are in contact with ends of one yoke 23, and the south poles of the two magnets are in contact with ends of the other yoke 23. Therefore, as shown by the broken lines in FIG. 4, the line of magnetic force due to the two magnets 22 passes through the inside of each yoke 23, and heads toward the center of the opposite yoke at the center of yoke 23 in the arc direction. The lines of magnetic force generated by the pair of magnets are plane-symmetric with the yz plane passing through the shaft 15 as the plane of symmetry. The x direction and the y direction are defined by the magnetic field generation unit 21. The upper part of FIG. 4 shows a case where the direction By of the magnetic field lines from one yoke 23 to the other yoke 23 coincides with the direction of detection by the magnetic detection element 24 (maximum sensitivity direction) as a reference position. On the other hand, the lower part of FIG. 4 shows a case where the magnetic field generation unit 21 is rotated. When the magnetic field generation unit 21 rotates, the x direction and the y direction also rotate as shown in the lower part of FIG. 4. Since the magnetic field formed by the magnetic field generation unit 21 is a closed magnetic field, it can be less affected by an external magnetic field. Further, since the leakage of the magnetic field can be reduced, the size of the magnet 22 required to obtain the magnetic field of the same strength can be reduced.

Since the magnetic field generation unit 21 is integrally formed with the gear 14, when the gear 14 rotates, the magnetic field generation unit 21 also rotates, and the direction of the magnetic force lines also rotates. On the other hand, the magnetic detection element 24 is provided in the housing cover 19 and does not rotate. Therefore, when the magnetic field generation unit 21 rotates with the rotation of the gear 14, the direction By of the magnetic force lines formed by the magnetic field generation unit 21 near the center thereof does not match the direction of detection by the magnetic detection element 24. With this configuration, the detection value of the magnetic detection element 24 changes. Therefore, the ECU can detect the change in the direction of the magnetic force lines from the change in the detection value of the magnetic detection element 24, and can detect the rotation angle of the gear 14 and the rotation angle of the valve body 16.

Figure 5:
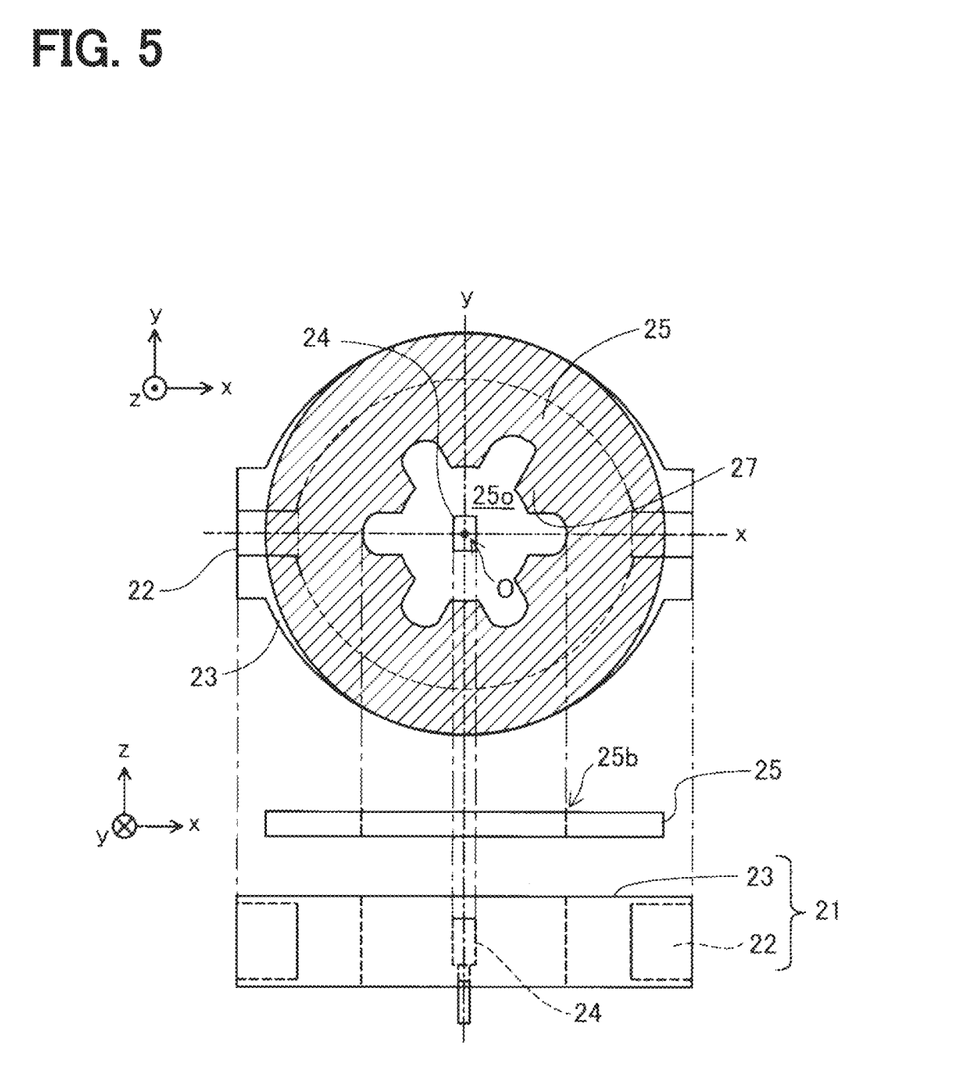
FIG. 5 is an explanatory view showing a fixing metal member.
Figure 6:
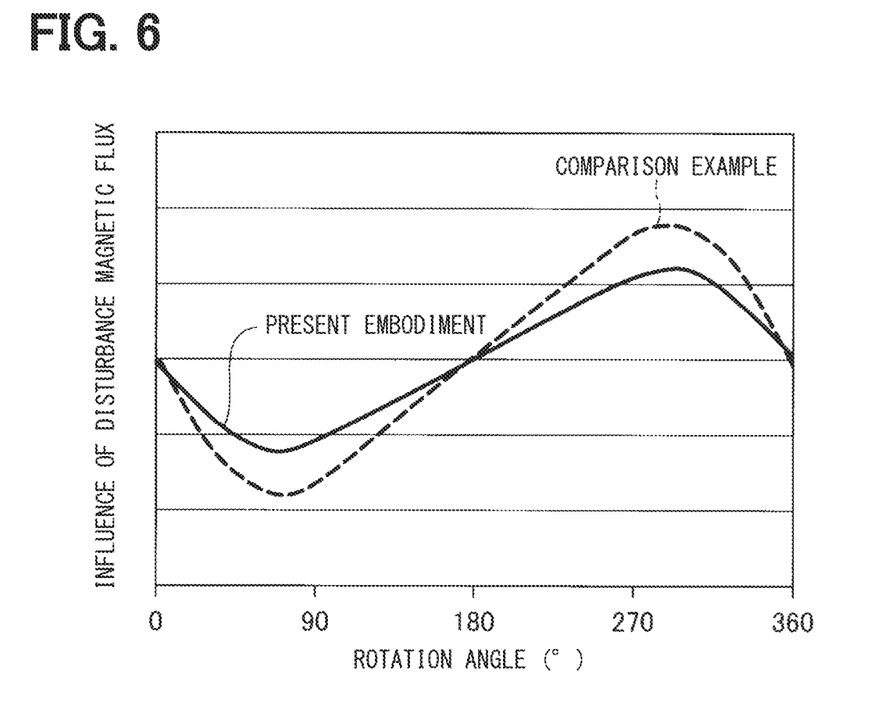
FIG. 6 is a diagram showing a magnitude of influence of disturbance of a comparative example and the present embodiment.

As shown in FIGS. 1 to 3, the fixing metal member 25 is arranged so as to overlap the magnetic field generation unit 21 described above in the z direction. The arrangement of the magnetic field generation unit 21 and the fixing metal member 25 and the shape and function of the fixing metal member 25 will be described in detail below. As shown in FIG. 5, the fixing metal member 25 made of a magnetic material has a substantially circular shape whose outer edge substantially overlaps with the magnet 22 and the yoke 23 of the magnetic field generation unit 21 when viewed from the z direction. Therefore, the fixing metal member 25 shields the external magnetic fields. Therefore, even if members such as a motor, a harness, and a coil are arranged in the vicinity of the magnetic field generation unit 21, and the magnetic fields from these members reach the magnetic field generation unit 21, the configuration can suppress the influence of the detected value by the magnetic fields passing through the magnetic detection element 24. As a result, as shown in FIG. 6, even if an external magnetic field (hereinafter, also referred to as a disturbance magnetic field) invades, the influence on the detection value by the magnetic detection element 24 can be suppressed, so that deterioration of accuracy for detection of the rotation angle by the valve body 16 can be suppressed. The fixing metal member 25 does not have to have a size such that the outer edge substantially overlaps with the magnets 22 and the yokes 23 of the magnetic field generation unit 21 when viewed from the z direction. The presence of the magnetic body fixing metal member 25 can shield the disturbance magnetic field passing through the magnetic detection element 24.

Since the fixing metal member 25 is made of a magnetic material, the fixing metal member 25 forms a magnetic circuit together with the magnets 22 and the yokes 23 and is magnetized. Therefore, even if the spring 20 or the like is worn and abrasion powder is generated on the metal, for example, the fixing metal member 25 can attract the abrasion powder. As a result, the abrasion powder can be prevented from being adsorbed on the magnets 22, and the configuration can suppress the influence on the magnetic detection element 24.

The fixing metal member 25 has an opening 25o at the center of rotation O when viewed from the z direction, and the shaft 15 is inserted into the opening 25O. The fixing metal member 25 and the shaft 15 are fixed by caulking. The opening 25O is formed with a fitting portion 27 that is in contact with the shaft 15 toward the center of rotation O. The fitting portion 27 has a shape that repeats six concave-convex shapes in the circumferential direction on the xy plane, and one of the concave portions has a shape different from the others. Therefore, the fitting portion 27 has an asymmetrical shape when the entire shape is viewed from the z direction. The fixing metal member 25 is formed by, for example, pressing. When the fixing metal member 25 is formed by pressing, burrs 25b may be formed on the cut surface. In the present embodiment, since the fitting portion 27 has an asymmetrical shape, the punching direction can be recognized and the forming direction of the burr 25b is can be recognized when the press is punched to form the fixing metal member 25. If the forming direction of the burr 25b can be recognized, the orientation of the burr 25b can be aligned when the fixing metal member 25 is placed on the mold for molding the gear 14 and integrally molded with resin. The configuration can suppress the influence on the dimensional accuracy between the gear 14 and the fixing metal member 25 by the burr 25b and the mold interfering with each other.

As shown in FIG. 6, the fixing metal member of the present embodiment can reduce the influence of the disturbance magnetic field compared to a fixing metal member having the same shape of the present embodiment and formed of a magnetic material.

FIGS. 7 to 11 show other shapes of the fixing metal member. While the fixing metal member 25 shown in FIG. 5 has a substantially disk shape, fixing metal members 25A to 25E shown in FIGS. 7 to 11 have protrusions 26A to 26E on the outer periphery when viewed from the z direction. Even in this case, the effect of shielding the disturbance magnetic field can be obtained by the presence of the fixing metal members 25A to 25E as in the above embodiment. Hereinafter, the configuration of each of the fixing metal members 25A to 25E will be described in order. The fixing metal member 25A shown in FIG. 7 has a shape in which positions overlap with the magnets 22 are cut out as compared with the fixing metal member 25 shown in FIG. 5. That is, the fixing metal member 25A has a shape provided with multiple protrusions 26A protruding so as to overlap the yokes 23 of the magnetic field generation unit 21. The gear 14 is insert-molded in a state where the fixing metal member 25A is embedded. In this configuration, the presence of the two protrusions 26A causes the transmission of the rotational force from the shaft 15 to the gear 14 via the fixing metal member 25A more reliably. The same applies when the rotation is stopped. Since the anchor effect is generated by the protrusions 26A, it is possible to suppress the occurrence of a situation in which only the gear 14 rotates even if a large rotational load is applied to the gear 14. This effect can be achieved in any embodiment including the protrusions 26A to 26E shown in FIGS. 7 to 11.

Figure 7:
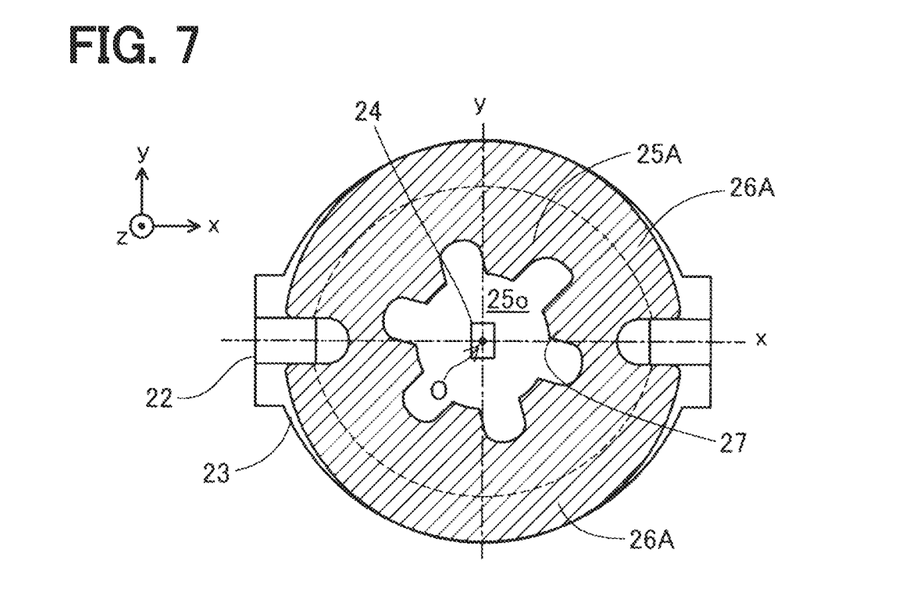
FIG. 7 is an explanatory view showing another fixing metal member.

In the fixing metal member 25A shown in FIG. 7, the two protrusions 26A have a plane-symmetrical shape with the yz plane passing through the center of rotation O as the plane of symmetry. Therefore, the protrusions 26A come close to the two magnets 22 of the magnetic field generation unit 21 in the same shape, and the effects on the magnetic flux density generated by the respective magnets 22 are substantially the same, and the magnetic field generated by the magnetic field generation unit 21 is not distorted. As a result, the detection accuracy can be maintained without affecting the detection of the magnetic flux density of the magnetic detection element 24, and the influence of the shape of the fixing metal member 25 when the magnetic detection element 24 detects the magnetic flux density can be suppressed. Also in FIG. 7, the fitting portion 27 has an asymmetrical shape. As described above, there is no significant difference in the influence of the magnetic detection element 24 on the magnetic flux density detected by the magnetic detection element 24 regardless of whether the shape of the fitting portion 27 is asymmetrical or symmetrical.

In FIG. 7, the two protrusions 26A of the fixing metal member 25A have a shape that overlaps with the yokes 23 but does not overlap with the magnets 22. In this configuration, since the magnets 22 which are the source of the magnetic flux and the fixing metal member 25A do not overlap, a case where the detected magnetic flux density of the magnetic detection element 24, in the magnetic field generated by the magnetic field generation unit 21, decreases by the influence of the fixing metal member 25A is unlikely occur. However, the mounting positions of the two protrusions 26A with respect to the magnetic field generation unit 21 may be rotated by 90 degrees so that the protrusions 26A overlap with the magnets 22 but do not overlap with the center of the yokes 23. Even in this case, since the protrusions 26A are arranged close to each of the two magnets of the magnetic field generation unit 21 in the same shape, the influence on the magnetic flux density generated by each magnet 22 is substantially the same, and the magnet field detected by the magnetic detection element 24 is not distorted.

In FIG. 7, the fitting portion 27 has an asymmetrical shape when viewed from the z direction so that the direction of the burr can be determined. Even if the fitting portion 27 does not have an asymmetrical shape, the shape of the fixing metal member 25A when viewed from the +z direction and the shape of the fixing metal member 25A when viewed from the −z direction may be distinguished from each other using the shape of the protrusions 26A and the shape of the fitting portion 27. For example, the fitting portion 27 may have a shape having multiple concave-convex shapes and a symmetrical plane parallel to the z direction passing through the rotation center O of the gear 14. In this case, the symmetrical plane of the fitting portion 27 may mismatch with an arbitrary symmetrical plane parallel to the z direction passing through the center of rotation O of the gear 14 about the protrusion 26A. For example, in the example shown in FIG. 7, even if the fitting portion 27 has a symmetrical shape, the symmetrical plane does not match with any symmetrical plane of the protrusion 26A. Thus, it is easy to determine whether the fixing metal member 25A faces front or back. In this configuration, it can be determined from the shape of the protrusions 26A and the shape of the fitting portion 27 which side of the fixing metal member 25A the burr is generated.

Figure 8:
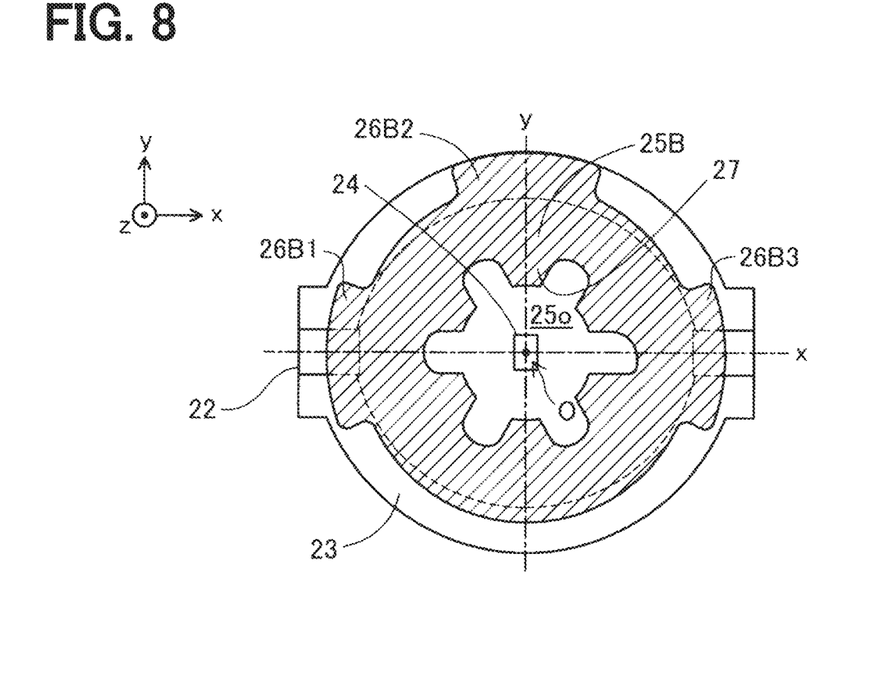
FIG. 8 is an explanatory view showing another fixing metal member.

The fixing metal member 25B shown in FIG. 8 includes three protrusions 26B1, 26B2, and 26B3. When the three protrusions are not distinguished, they are simply referred to as protrusions 26B. The three protrusions 26B are plane symmetric with the yz plane as the plane of symmetry. If the protrusions 26B are plane-symmetrical with the yz plane as the plane of symmetry, the protrusions 26B1 and 26B3 are arranged in the same shape close to the two magnets 22 of the magnetic field generation unit 21, so that the influence to the magnetic field line given by the protrusion 26B is also plane symmetric with the yz plane as the plane of symmetry. The influence of the protrusion 26B on each magnet 22 becomes substantially the same, and the occurrence of distortion of the shape of the magnetic force line passing through the magnetic detection element 24 due to the presence of the protrusion 26B is suppressed. As a result, the influence of the shape of the fixing metal member 25 when the magnetic detection element 24 detects the magnetic flux density can be suppressed. In addition, in FIGS. 8 and 9, three protrusions 26B1, 26B2 and 26B3 may be connected to form one protrusion 26B. In this case as well, since the protrusion 26B is plane-symmetrical with the yz plane as the plane of symmetry, the influence of the protrusion 26B on the magnetic force line is also plane-symmetrical with the yz plane as the plane of symmetry. Thus, the influence of the protrusion 26B on each magnet 22 becomes substantially the same, and the occurrence of distortion of the shape of the magnetic force line passing through the magnetic detection element 24 due to the presence of the protrusion 26B is suppressed. Therefore, it is possible to suppress the influence of the magnetic detection element 24 on the detection accuracy.

Figure 9:
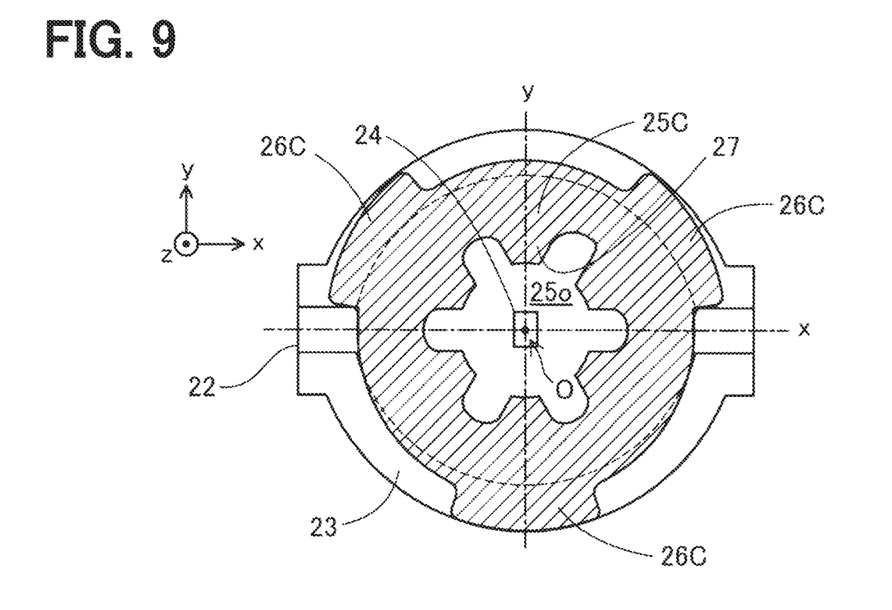
FIG. 9 is an explanatory view showing another fixing metal member.

The fixing metal member 25C shown in FIG. 9 includes three protrusions 26C. The three protrusions 26C are plane-symmetrical with the yz plane as the plane of symmetry, and the three protrusions 26C are evenly provided on the circumference centered on the rotation center O of the gear 14. If the protrusions 26C are provided to be plane-symmetrical with the yz plane as the plane of symmetry and provided evenly, the shapes of the protrusions 26C arranged close to the two magnets 22 of the magnetic field generation unit 21 will be the same, so that the fixing metal member 25C is plane-symmetrical with the yz plane as the plane of symmetry. Thus, the influence of the protrusion 26C on each magnet 22 becomes substantially the same, and the occurrence of distortion of the shape of the magnetic force line passing through the magnetic detection element 24 due to the presence of the protrusion 26C is suppressed. Therefore, it is possible to suppress the influence of the magnetic detection element 24 on the detection accuracy.

In FIGS. 8 and 9, the fitting portion 27 has an asymmetrical shape when viewed from the z direction, but may have a symmetrical shape. For example, the fitting portion 27 may be plane-symmetrical with a plane passing through the center of rotation O and other than the yz plane as the plane of symmetry. In this case, from the shape of the protrusion 26B or the protrusion 26C and the shape of the fitting portion 27, it can be determined which side of the fixing metal member 25B or 25C has a burr. The same applies when the number of protrusions 26B or 26C is an odd number of 4 or more.

Figure 10:
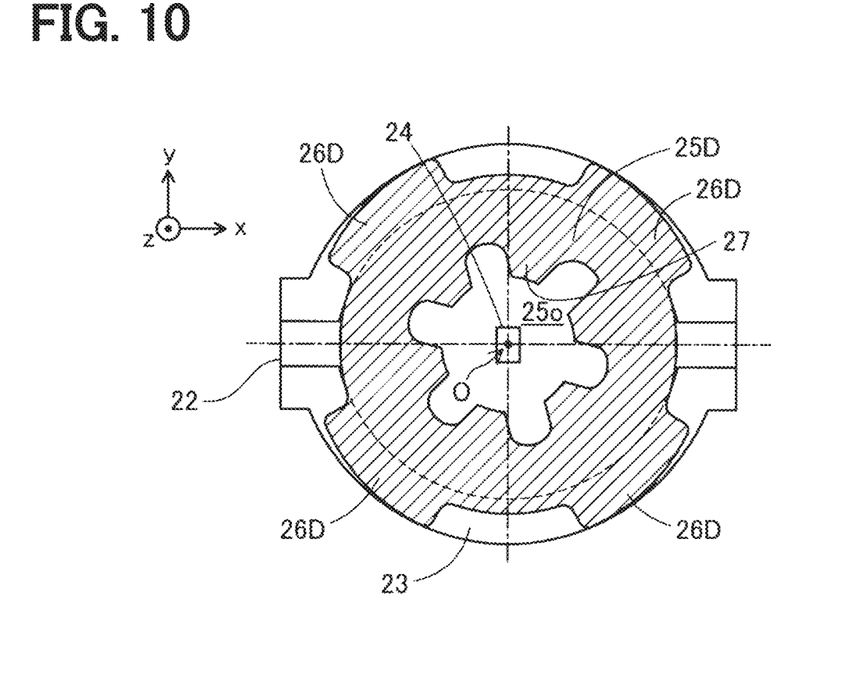
FIG. 10 is an explanatory view showing another fixing metal member.

In the example shown in FIG. 10, the fixing metal member 25D includes four protrusions 26D. The four protrusions 26D are plane-symmetrical with the yz plane as the plane of symmetry, and the four protrusions 26D are evenly provided on the circumference centered on the rotation center O of the gear 14. Therefore, even in the example shown in FIG. 10, the influence of the protrusions 26D on the magnetic force line is plane-symmetrical with the yz plane as the plane of symmetry since the shapes of the protrusions 26D arranged close to the magnets 22 of the magnetic field generation unit 21 have substantially the same shape. As a result, since the influence of the protrusions 26D on each magnet 22 becomes substantially the same, distortion of the detection magnetic flux of the magnetic detection element 24 can be less likely to occur and the influence of the shape of the fixing metal member 25 can be suppressed. When the four protrusions 26D are plane-symmetrical with the yz plane as the plane of symmetry, the four protrusions 26D are not to be evenly provided on the circumference centered on the rotation center O of the gear 14. Further, for the protrusion 26D, any symmetric plane parallel to the z direction passing through the rotation center O of the gear 14 may be different from any symmetric plane parallel to the z direction passing through the rotation center O of the gear 14 for the fitting portion 27.

Figure 11:
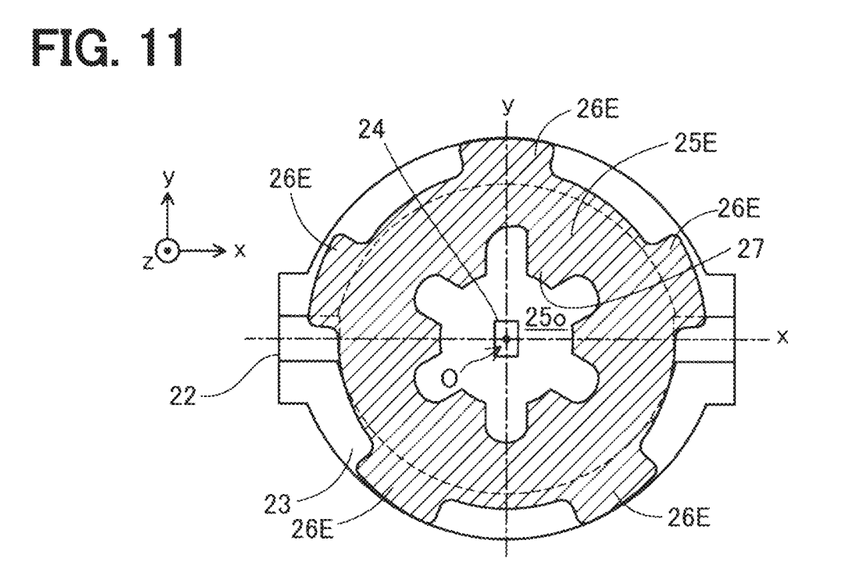
FIG. 11 is an explanatory view showing another fixing metal member.

In the example shown in FIG. 11, the fixing metal member 25E includes five protrusions 26E, the five protrusions 26E are plane-symmetrical with the yz plane as the plane of symmetry, and the five protrusions 26E are evenly provided on the circumference centered on the rotation center O of the gear 14. Therefore, even in the example shown in FIG. 11, the influence of the protrusions 26E on the detected magnetic flux is also plane-symmetrical with the yz plane as the plane of symmetry since the shapes of the protrusions 26E arranged close to the magnets 22 of the magnetic field generation unit 21 have substantially the same shape. As a result, since the influence of the protrusions 26E on each magnet 22 becomes substantially the same, distortion of the detection magnetic flux of the magnetic detection element 24 can be less likely to occur and the influence of the shape of the fixing metal member 25 can be suppressed.

Figure 12:
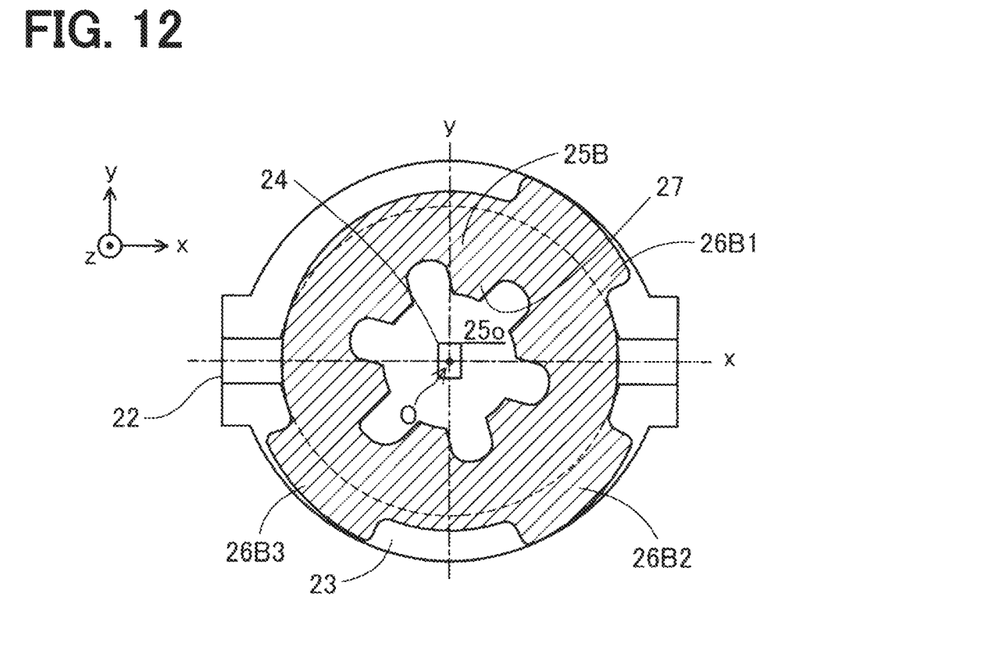
FIG. 12 is an explanatory view showing another fixing metal member.

The protrusions 26 does not have to be provided symmetrically with the yz plane as the plane of symmetry. For example, FIG. 12 shows an example in which the fixing metal member 25B used in FIG. 8 is rotated 135° clockwise around the rotation center O of the shaft 15 and attached to the shaft 15. The fixing metal member 25B shown in FIG. 12 includes three protrusions 26B as in the example shown in FIG. 8, but unlike the example shown in FIG. 8, the protrusions 26B is not arranged plane-symmetrical with the yz plane as the plane of symmetry. However, even in this case, the effect of shielding the disturbance magnetic field can be obtained due to the presence of the fixing metal member 25B. Further, the presence of the three protrusions 26B also has an effect of more reliably transmitting the rotational force from the shaft 15 to the gear 14 via the fixing metal member 25B.

Figure 13:
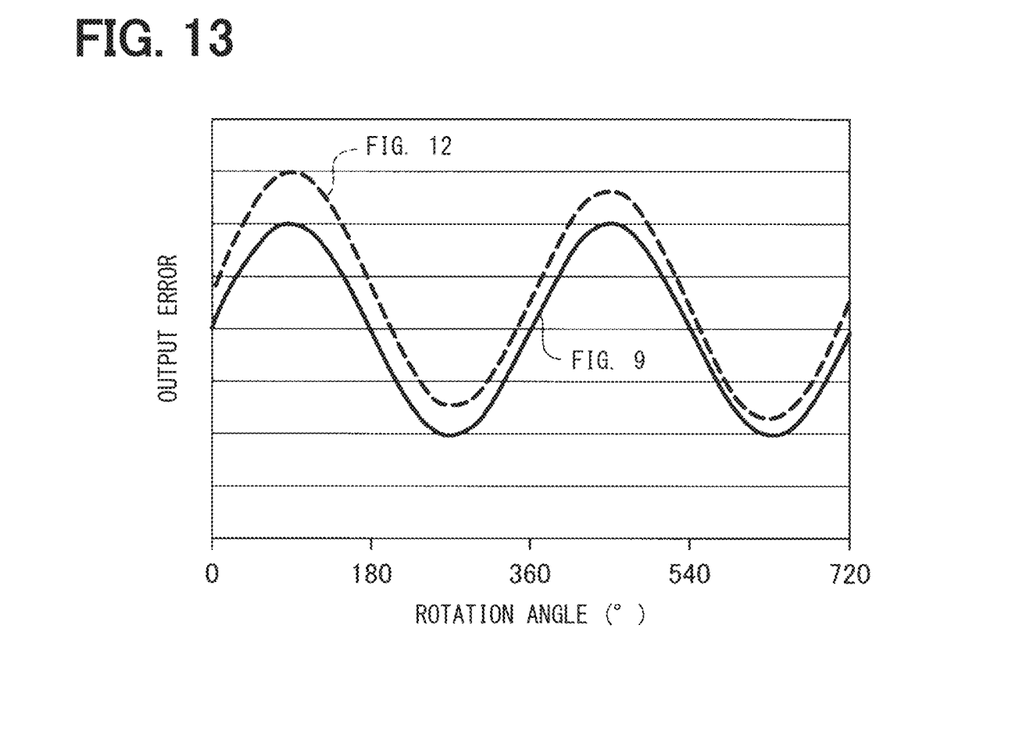
FIG. 13 is a diagram showing an output error when the fixing metal member shown in FIG. 12 is used.

As shown in FIG. 13, it is a graph which shows the output error when the fixing metal member 25B of FIG. 12 is used. As shown in the figure, in this case, a gain error and an offset error occur in the output error. On the other hand, if the fixing metal member 25B is arranged as shown in FIG. 8, no gain error and offset error occur in the output error. By comparing the cases of FIG. 8 and FIG. 12, regardless of whether the protrusions are 26A to 26E, it is found that it is more preferable that protrusions are placed close to the two magnets 22 that generate the magnetic fields in the same shape since the protrusions can suppress the gain error and the offset error when the magnetic detection element 24 detects the output.

Figure 14:
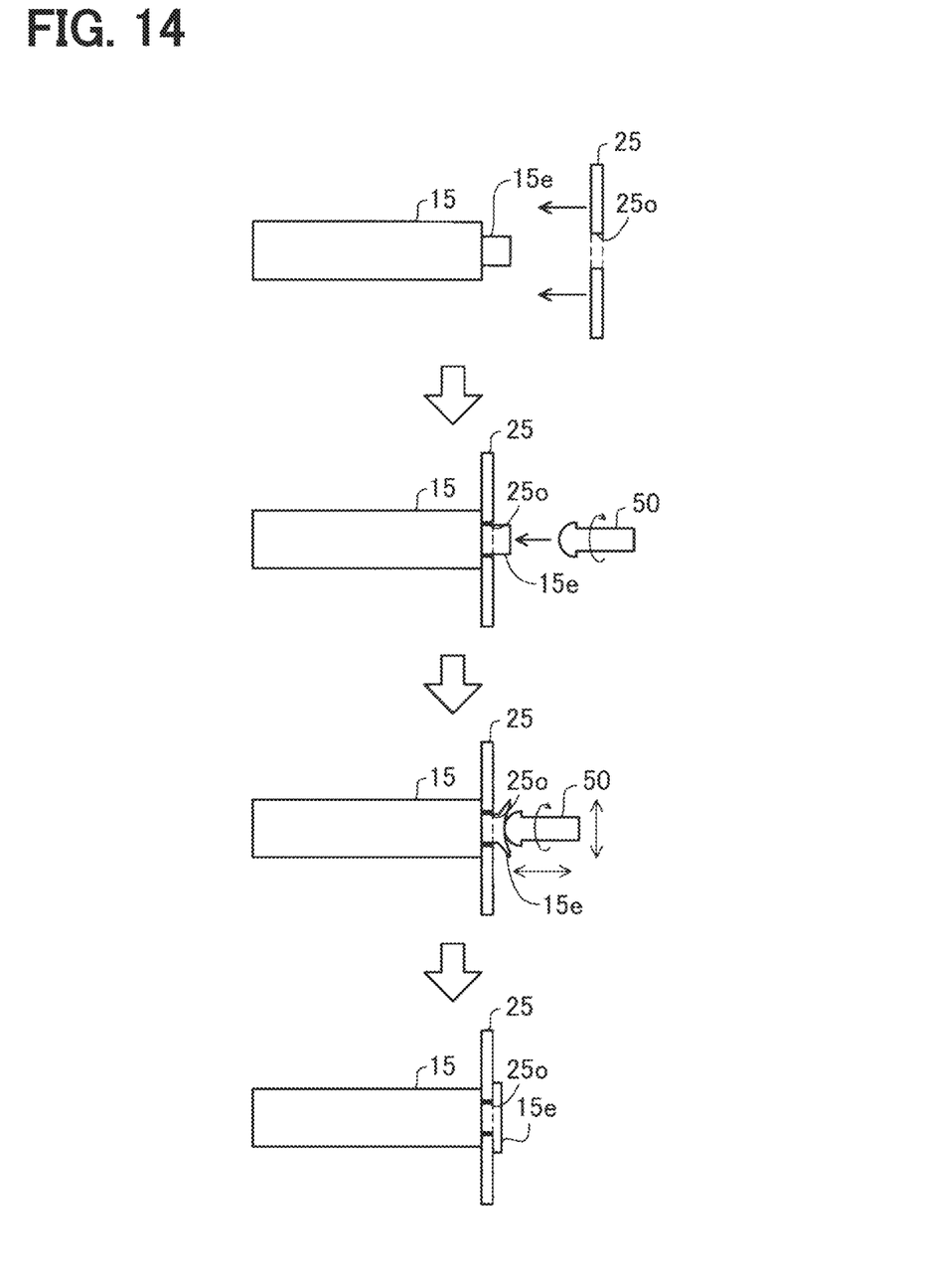
FIG. 14 is an explanatory diagram showing caulking fixation.

Fixing by caulking will be described with reference to FIG. 14. The end portion 15e of the shaft 15 is formed thinner than the shaft 15. First, the fixing metal member 25 is attached so that the end portion 15e is inserted into the opening 25o of the fixing metal member 25. Next, using a caulking tool 50, the end portion 15e is gradually crushed and expanded. Then, the fixing metal member 25 is sandwiched and fixed between a main body of the shaft 15 and the crushed end portion 15e. The shape of the end portion 15e of the shaft 15 may have a hollow tube shape. Further, the shaft 15 and the fixing metal member 25 may be attached by other methods such as high frequency welding and laser welding regardless of caulking.

Second Embodiment

Figure 15:
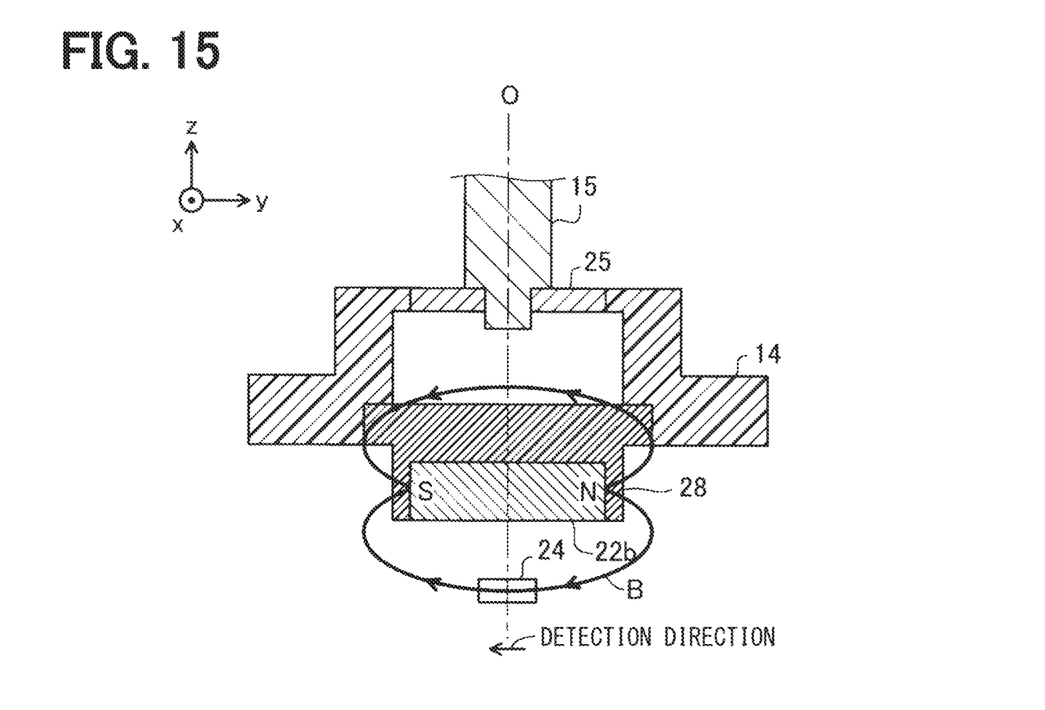
FIG. 15 is an explanatory diagram showing a configuration of a magnetic circuit according to a second embodiment.

As shown in FIG. 15, in the second embodiment, the magnetic field generation unit does not include a yoke but includes a magnet 22b. The magnet 22b is arranged between the fixing metal member 25 and the magnetic detection element 24, and the direction of the magnetic poles is perpendicular to the direction along the shaft 15. The magnet 22b is molded by a magnet mold member 28, and is integrally molded with a resin on the gear 14 together with the fixing metal member 25. As shown in FIG. 15, the magnetic flux density of the magnet 22b exits from the N pole, passes through the magnetic detection element 24, and enters the S pole. The magnetic detection element 24 detects the passing magnetic flux density.

Figure 16:
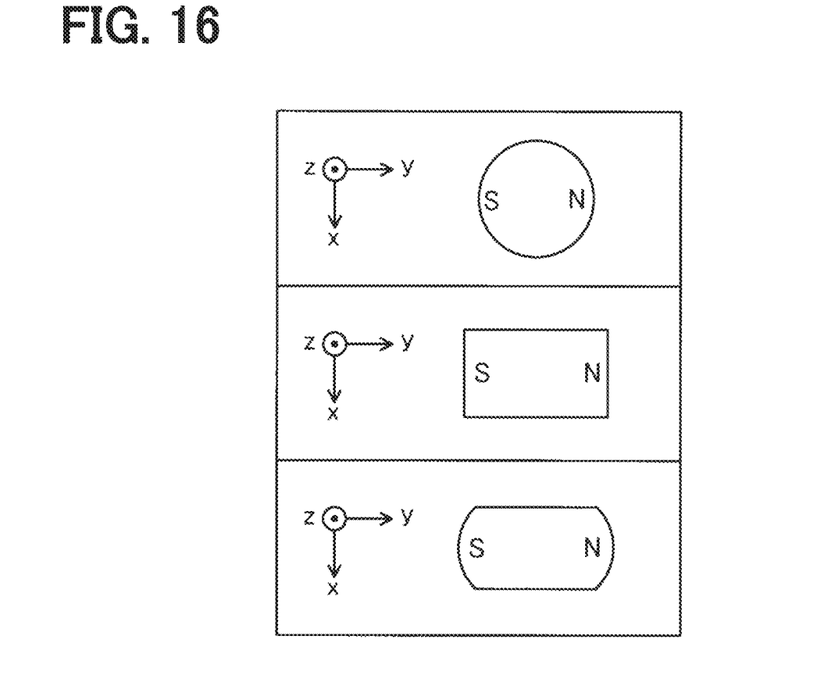
FIG. 16 is an explanatory diagram showing an example of shapes of magnets.

As the magnet 22b, as shown in FIG. 16, magnets having other shapes such as a circular magnet magnetized in the radial direction, a quadrangular magnet, and a magnet having an arc on the pole side can also be used. Further, the magnet 22b may be an elliptical magnet magnetized in the major axis direction or the minor axis direction. The number of magnets does not have to be limited to one, and two or more magnets may be used.

Also in the second embodiment, the fixing metal member 25 suppresses the application of the disturbance magnetic field to the magnetic force lines generated by the magnet 22, so that the deterioration of the detection accuracy of the detection angle calculated from the magnetic flux density can be suppressed as in the first embodiment. The shapes of the protrusions 26 and the fitting portion 27 of the fixing metal member 25 are similar to the shapes described in the first embodiment, and are plane-symmetrical with respect to the plane of symmetry of the magnetic force lines generated by the magnet. Therefore, the same effect as described in the first embodiment is obtained.

In the above embodiments, the electronic control throttle 10 that controls the amount of intake air to the engine of the vehicle has been described as an example. However, this device may be provided to an EGR valve that controls the amount of exhaust gas recirculation of an EGR device, a valve used in a turbocharger, or a valve that controls water flow, and detect an opening degree of a rotated valve body. It may be used for moving objects other than a vehicle or equipment of facilities such as factories, and may be used for detecting a rotation angle of various rotating objects. The rotation angle range to be detected may be 360 degrees or less, or may be geared down to detect a rotation angle of 360 degrees or more.

The present disclosure should not be limited to the embodiments described above, and various other embodiments may be implemented without departing from the scope of the present disclosure. For example, the technical features in the embodiments can be replaced or combined as appropriate. Also, if the technical features are not described as essential in the present specification, they can be deleted as appropriate.

What is claimed is:

1. A rotation angle detection device that detects a rotation angle of a valve body, comprising:
   a shaft connected to the valve body;
   a gear that is connected to the shaft and rotates the shaft to rotate the valve body;
   a magnetic field generator that is arranged on a gear side and generates a magnetic field;
   a fixing metal member that is made of a magnetic material, is provided at a position covering at least a part of the magnetic field generator, and fixes the gear to the shaft; and
   a magnetic detection element that is arranged on an extension of the shaft and detects magnetic flux density of the magnetic field that rotates together with the gear, wherein
   the fixing metal member has three or more protrusions that protrude in a radial direction of a circle centered on the shaft,
   the three or more protrusions are plane-symmetrically arranged with respect to a plane of symmetry of a magnetic force line generated by the magnetic field generator, and
   the three or more protrusions are unevenly arranged on a circumference centered on a center of rotation of the gear.

2. The rotation angle detection device according to claim 1, wherein
   the magnetic field generator includes:
   a pair of magnets; and a pair of yokes that connect N poles of the pair of magnets to each other and S poles of the pair of magnets to each other, and has a plane perpendicular to a direction extending the shaft together with the pair of magnets, and the magnetic field generator generates a closed magnetic field.

3. The rotation angle detection device according to claim 1, wherein the magnetic field generator includes a magnet that is arranged between the fixing metal member and the magnetic detection element, and has a magnetic pole whose direction is perpendicular to a direction extending the shaft.

4. The rotation angle detection device according to claim 1, wherein the gear has a portion fixed to the shaft, the portion is made of resin, and the fixing metal member is integrally molded with the resin of the gear.

5. The rotation angle detection device according to claim 1, wherein the fixing metal member has a fitting portion through which a convex portion provided at a tip of the shaft penetrates and fixes the shaft, and the fitting portion has an asymmetrical shape when viewed from a direction extending the shaft.

6. The rotation angle detection device according to claim 1, wherein the fixing metal member is made of a cold-rolled steel plate.

7. The rotation angle detection device according to claim 1, wherein the shaft and the fixing metal member are fixed with each other by caulking fixation.

* * * * *